(12) United States Patent
Geertsen et al.

(10) Patent No.: US 6,652,794 B2
(45) Date of Patent: Nov. 25, 2003

(54) CASTING PATTERN SEAM TOOL AND METHOD FOR ITS USE

(75) Inventors: Robert J. Geertsen, Clackamas, OR (US); Edward L. Hazlewood, Portland, OR (US)

(73) Assignee: PCC Structurals, Inc., Portland, OR (US)

( * ) Notice: Subject to any disclaimer, the term of this patent is extended or adjusted under 35 U.S.C. 154(b) by 0 days.

(21) Appl. No.: 10/017,269

(22) Filed: Dec. 13, 2001

(65) Prior Publication Data

US 2002/0108717 A1 Aug. 15, 2002

Related U.S. Application Data

(60) Provisional application No. 60/256,762, filed on Dec. 19, 2000.

(51) Int. Cl.[7] ............................................... B29C 65/70
(52) U.S. Cl. ....................... 264/261; 264/277; 425/123; 425/127
(58) Field of Search ................. 264/261, 263, 264/277; 425/123, 127

(56) References Cited

U.S. PATENT DOCUMENTS

| | | |
|---|---|---|
| 2,274,060 A | 2/1942 | Hart |
| 3,491,182 A | 1/1970 | Hunder et al. |
| 3,938,774 A | 2/1976 | Smith |
| 3,970,488 A | 7/1976 | Nelson |
| 4,073,836 A | 2/1978 | Harrison et al. |
| 4,087,508 A | 5/1978 | Slaughter et al. |
| 4,160,313 A | 7/1979 | Radford |
| 4,261,947 A | 4/1981 | Ogi |
| 4,483,813 A | 11/1984 | Longo |
| 4,626,391 A | 12/1986 | Taylor |
| 4,643,041 A | 2/1987 | Benton |
| 4,793,793 A | 12/1988 | Swenson et al. |
| 4,893,576 A | 1/1990 | Day et al. |
| 5,124,105 A | 6/1992 | Broughton et al. |
| 5,542,670 A | 8/1996 | Morano |
| 5,804,093 A | 9/1998 | Wyke et al. |
| 5,824,249 A | 10/1998 | Leitch et al. |
| 5,980,666 A | 11/1999 | Roth et al. |
| 6,033,200 A | 3/2000 | Fox |
| 6,071,455 A | 6/2000 | Hutchison et al. |

FOREIGN PATENT DOCUMENTS

JP          63-237917          10/1998

*Primary Examiner*—Robert Davis
(74) *Attorney, Agent, or Firm*—Klarquist Sparkman, LLP

(57) ABSTRACT

Embodiment of a disclosed seam tool comprise a rigid backing configured to be positioned about a seam region defined by at least two adjacent pattern segments. The rigid backing further includes an injection port and, typically, a gas outlet port, fluidly coupled to the seam region. The disclosed device may further include a resilient liner which contacts and forms a seal with surfaces of the pattern segments. Compensating grooves may be formed in the resilient material to allow complete filling of the seam region by weld-forming material. An injection fitting may be operably coupled to an injection port to provide an improved ability to receive weld-forming material to form welds. A method for forming a weld between plural, adjacently positioned pattern segments also is disclosed. The method comprises positioning the disclosed embodiments of the seam tool about a seam region defined between adjacent pattern segments. A weld-forming material is introduced into an injection port fluidly coupled to the seam region, and allowed to solidify to form a weld. In other embodiments, a seam tool may include an air bladder.

38 Claims, 11 Drawing Sheets

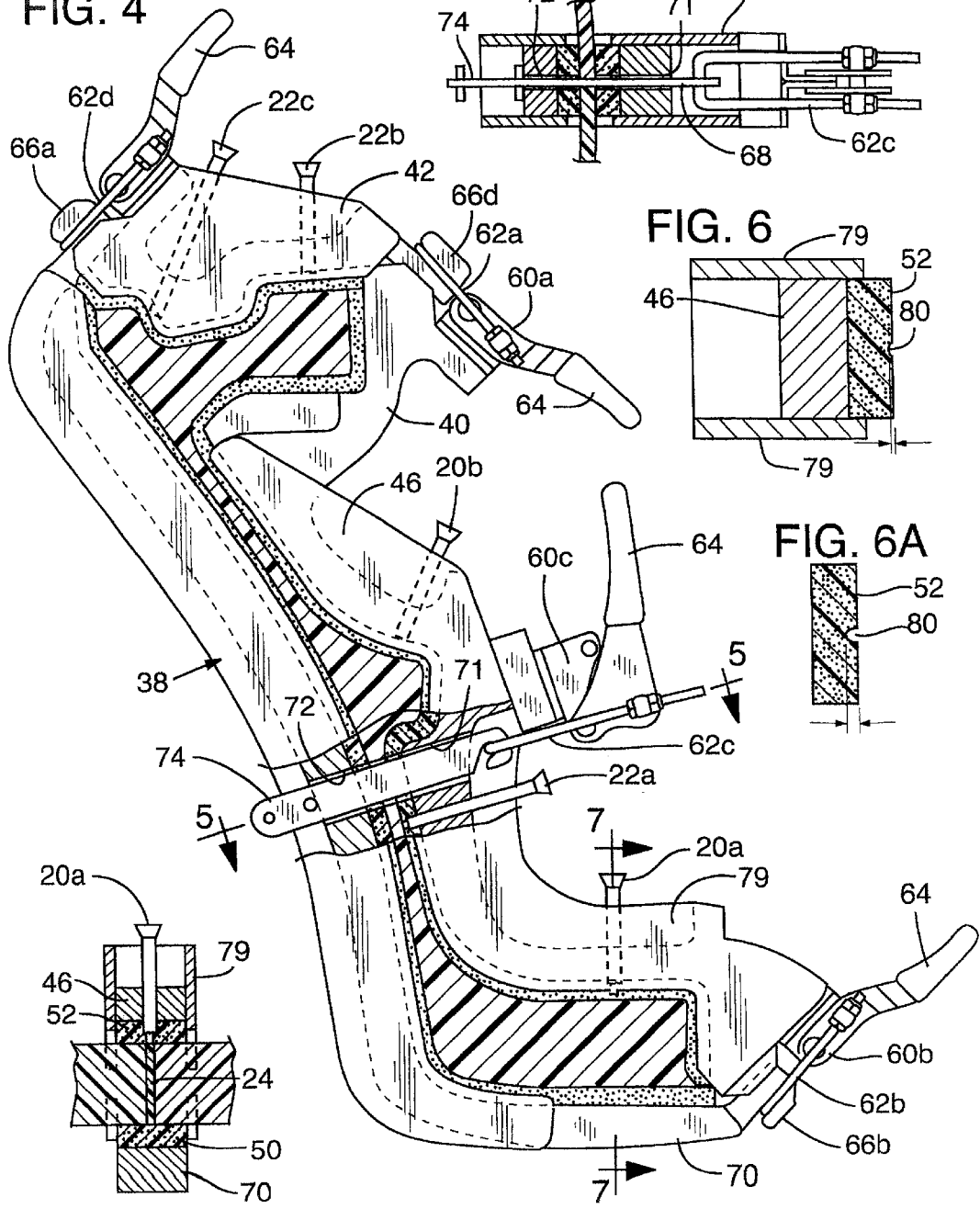
FIG. 4
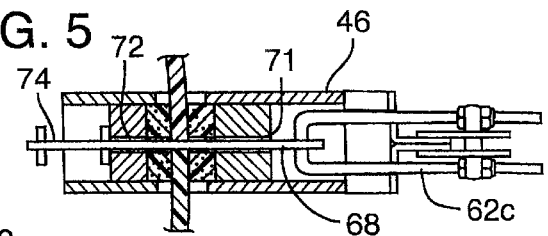
FIG. 5
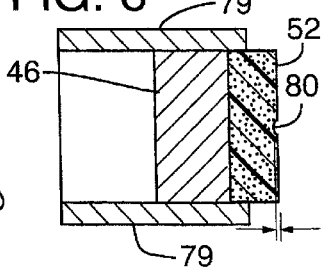
FIG. 6
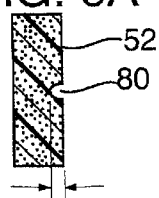
FIG. 6A
FIG. 7

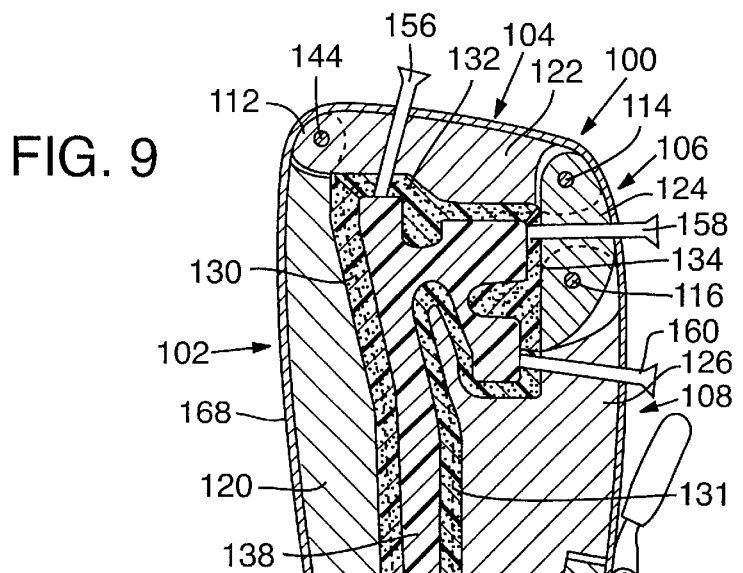
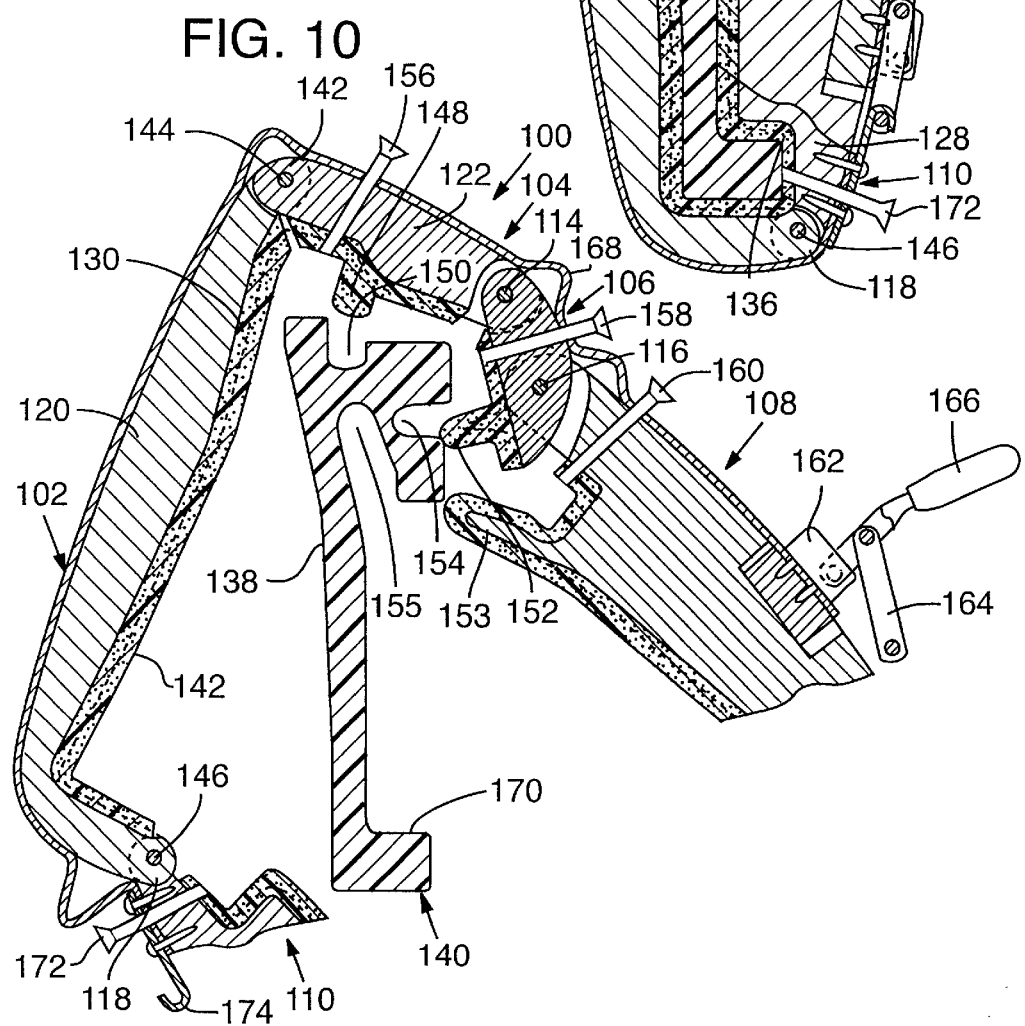

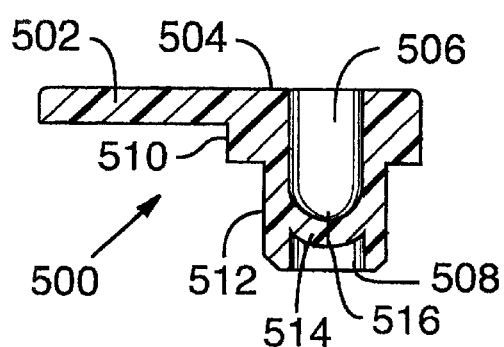
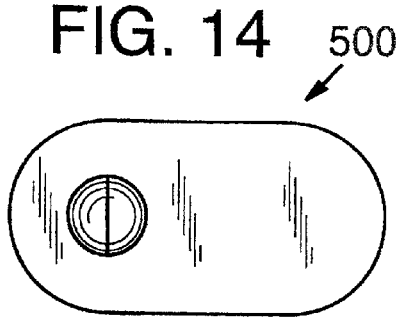
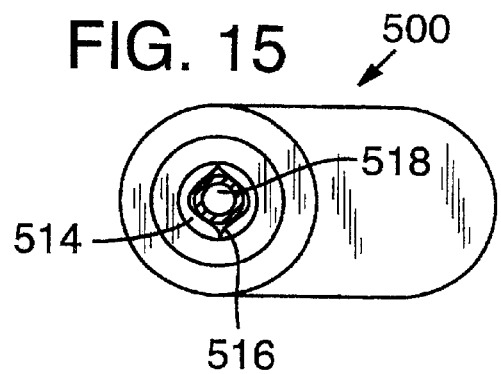
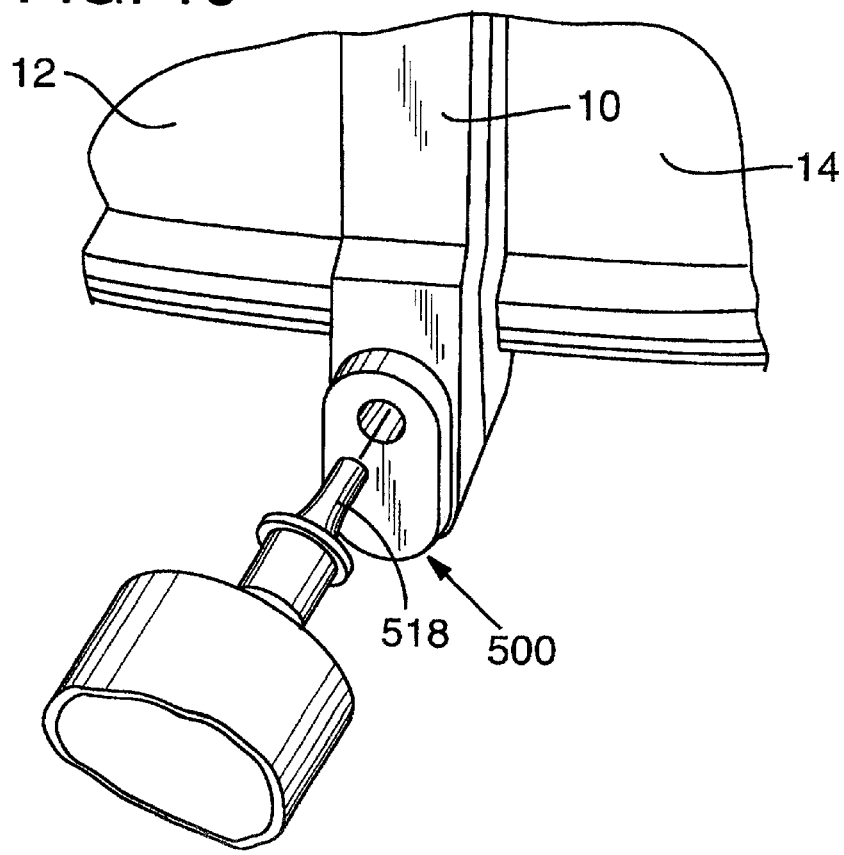

CASTING PATTERN SEAM TOOL AND METHOD FOR ITS USE

RELATED APPLICATION DATA

This application claims the benefit of the earlier filing date of U.S. Provisional Application No. 60/256,762, filed Dec. 19, 2000, entitled "Casting Pattern Seam Tool And Method For Its Use," which is incorporated herein by reference.

FIELD

The present invention concerns a device and method for forming welds, particularly wax welds, to couple individual pattern segments together during assembly of casting patterns.

BACKGROUND

Investment casting is a process for forming articles from metals and alloys. Casting molds are created for receiving liquid metal or alloy during the casting process. To make a casting mold, casting patterns are formed in a shape of the desired article from a wax or polymeric material. A refractory shell is formed about the pattern by serially dipping the pattern into aqueous or organic suspensions comprising refractory and other slurry materials, thereby forming an investment casting mold.

For complex shapes, plural pattern segments made from wax or polymeric material must be joined together by welds. Historically, seams between pattern segments have been formed by skilled operators using techniques such as single and double tape wax-weld-forming methods. Two or more pattern segments are first placed upon an assembly fixture, such as a table which can be rotated in various directions. Tape is applied to the exterior surfaces of two adjacent pattern segments and across a seam region defined by adjacent pattern segment edges. The tape forms a barrier for receiving or retaining wax in the seam region, and may be placed on one side or both sides of the adjacent pattern segments (i.e., single or double-tape methods). An operator rotates the fixture into a position suitable for feeding liquid wax into the seam region between the two segments. Placing the wax properly between the two pattern segments and in the seam region can require rotating the fixture, and therefore the pattern segments attached thereto, in various directions. Rotating the fixture allows the wax to flow uniformly through the seam, and further may facilitate expelling any air that may form bubbles in the wax. Once the junction between pattern segments is filled substantially with liquid wax, the wax is allowed to solidify to form a wax weld. An operator inspects the weld to make sure it is flush with the walls of the pattern segments and for any other defects.

The conventional weld-forming process is time consuming, often requiring 8–40 hours to form welds between segments, and labor intensive. A need therefore exists for a method for forming welds between adjacent pattern segments.

SUMMARY

The present invention provides an apparatus and method for forming welds between adjacent pattern segments used to assemble monolithic casting patterns. The described embodiments generally eliminate the need to rotate fixtures and substantially reduce the time required to form welds.

One embodiment of a disclosed seam tool comprises a rigid backing configured to be positioned about a seam region defined by at least two adjacent pattern segments. The rigid backing further includes an injection port and, typically, a gas outlet port, fluidly coupled to the seam region. The disclosed device may further include a resilient liner on a surface of the rigid backing, which resilient material contacts and forms a seal with surfaces of the pattern segments. Compensating grooves may be formed in the resilient material to allow complete filling of the seam region by weld-forming material.

An additional disclosed embodiment of a seam forming tool comprises pattern segment clamping means. The clamping means include an injection port for receiving weld-forming material and, typically, an outlet port, fluidly coupled to the seam region. The device also typically includes seal means, such as may be formed from a resilient material, with or without a compensating groove. Another disclosed embodiment includes an injection fitting operably coupled to an injection port.

A method for forming a weld between plural, adjacently positioned pattern segments also is disclosed. The method comprises positioning the disclosed embodiments of the seam tool about a seam region defined between adjacent pattern segments. A weld-forming material is introduced into an injection port fluidly coupled to the seam region, and allowed to solidify to form a weld in the seam region.

BRIEF DESCRIPTION OF DRAWINGS

FIG. 4 is a cross sectional plan view of the seam tool of FIG. 1 assembled and broken away to show a through-wall clamp.

FIG. 5 is a cross sectional view taken along line 5—5 in FIG. 4.

FIG. 6 is a cross sectional view illustrating a compensating groove formed in the resilient liner.

FIG. 6A is a cross sectional view illustrating variation in the dimensions of the compensating groove of FIG. 6.

FIG. 7 is a cross sectional view taken along line 7—7 in FIG. 4.

FIG. 9 is a cross sectional plan view of another embodiment of a seam tool according to the present invention assembled to position adjacent pattern segments properly for formation of a weld therebetween.

FIG. 10 is an exploded cross sectional plan view of the seam tool of FIG. 9.

FIG. 13 is a cross-sectional schematic view of one disclosed embodiment of an injection fitting having an injection aperture for receiving a wax injection tool.

FIG. 14 is a plan view of the injection fitting of FIG. 13 showing an exterior side of the injection fitting having an injection aperture for receiving a wax injection tool.

FIG. 15 is a plan view of the injection fitting of FIG. 13 showing a seam side of the injection fitting.

FIG. 16 is a schematic view illustrating the injection fitting of FIG. 13 operably coupled to a seam tool for receiving wax from an injection nozzle.

DETAILED DESCRIPTION

I. General Description

Figure 1:
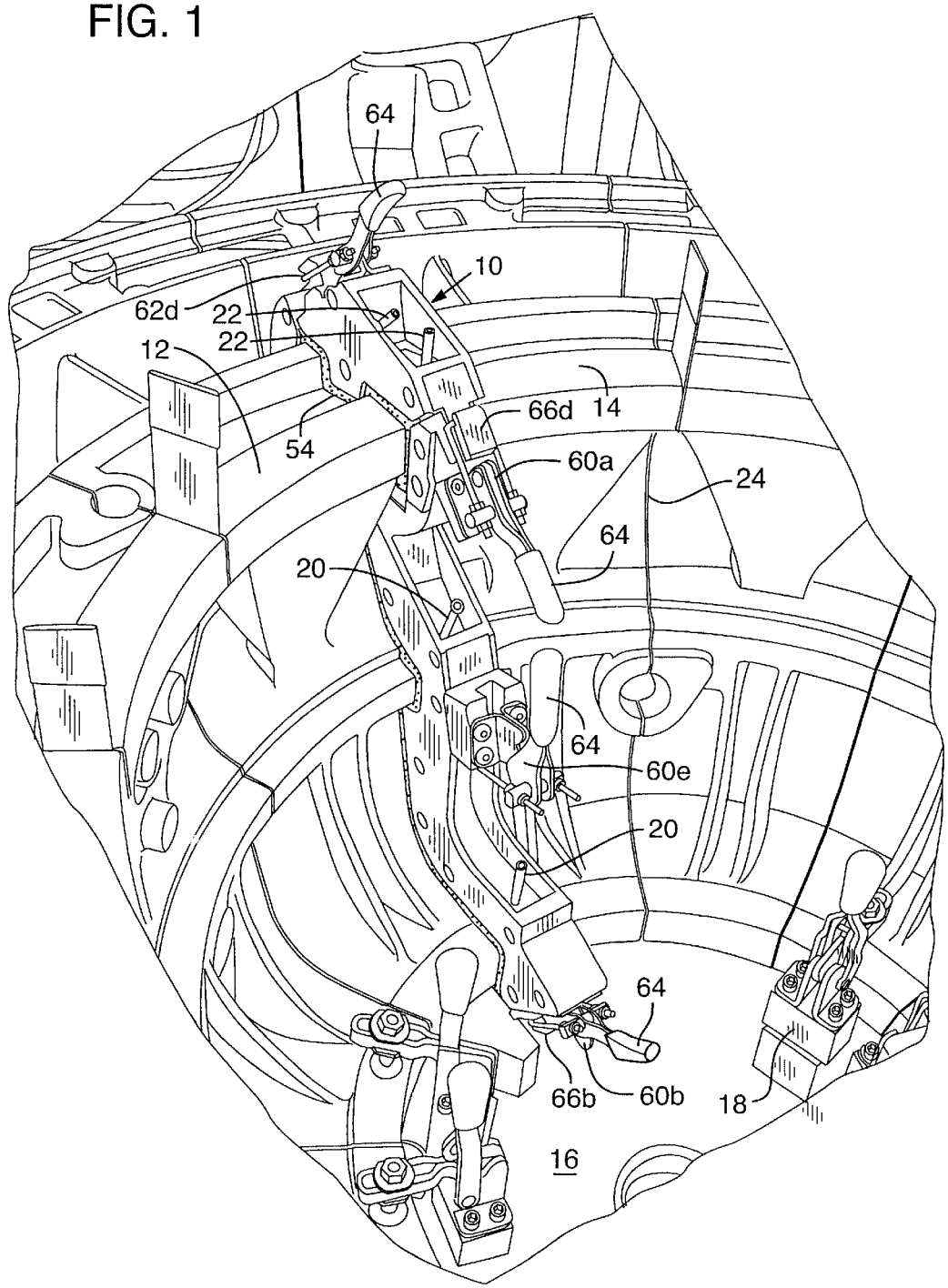
FIG. 1 is a perspective view illustrating one embodiment of a seam tool positioned to form a weld at the junction between pattern segments coupled to an assembly.

Investment casting pattern segments come in various configurations and dimensions. The present device is generally adaptable to forming welds between segments of virtually any configuration and dimension. Thus, while details are provided concerning the configuration and dimensions for several working embodiments, and methods for their manufacture and use, the present invention is not limited in scope to these embodiments.

A. Definitions

The following definitions are provided to assist the reader, but are not intended to define a term scope that would be narrower than understood by a person of ordinary skill in the art.

1. A pattern is a monolithic structure, generally made of wax or relatively low-melting polymeric material, about which refractory materials are deposited to form a mold. The wax or polymeric material is removed by heating to form a mold cavity in the mold into which liquid metal or alloy is introduced during a casting operation.

2. A pattern segment is any portion of a monolithic pattern. Patterns typically are divided into plural pattern segments that are welded together to provide the monolithic structure.

3. An assembly receiver is any structure upon which a pattern segment is placed for forming welds, and typically refers to a structure upon which plural pattern segments may be positioned adjacent one another in an orientation and relative alignment appropriate for assembling the monolithic pattern.

B. Rigid Backing

The illustrated embodiments include a rigid backing configured to be placed about plural pattern segments positioned adjacent one another so that a weld can be formed therebetween. The rigid backing can made of any suitable material including, without limitation, metal, wood, polymeric material(s), and combinations of such materials. Aluminum provides sufficient structural rigidity and machine ability and was used in working embodiments for forming the rigid backing.

The configuration of the seam tool is determined by a number of factors, primarily the shape of the pattern segments coupled by the weld, but also including:

(1) access (both within pattern segment and between pattern segments and assembly fixture) to install and remove the seam tool, (2) avoiding excessive deflection in the tool when clamped; and (3) optionally using a single multi-inject/multi-vent segment or multiple single inject/single vent segments.

Once determined, the seam tool configuration is formed by any suitable method, such as machining in the case of metal materials.

The seam tool also includes one or more channels or reservoirs. These channels and/or reservoirs are intended to receive any weld-forming material expelled from an outlet port during the weld-forming process.

C. Resilient Sealing Material and Compensating Groove

It is difficult to achieve a sealing relationship between rigid backing segments and pattern segments. Therefore the disclosed embodiments include a resilient material adjacent the rigid backing which functions as a gasket, or seal means, when pressed against surfaces of a pattern segment or segments. The resilient material is shaped in the configuration of the pattern segments. For the disclosed embodiments, this was achieved by casting the resilient material against the rigid backing.

The resilient material also typically includes a compensating groove. When the tool is assembled and tightly engaging the surface of the pattern segments the compensating groove is positioned directly about the seam region defined by adjacent pattern segments. The compensating groove allows weld-forming material to completely fill the seam region. Without a compensating groove the resilient material is forced into the seam region defined by edges of adjacent pattern segments as the seam tool is urged tightly against the pattern segments. The compensating groove allows the formation of a weld flush with the outer surfaces of adjacent pattern segments.

Various materials are suitable for forming the resilient backing. Factors considered for selecting the resilient backing included (1) sufficient resiliency to compress and form a seal when engaging the pattern segments, (2) availability, (3) expense, and (4) the ability to be formed into desired configurations, such as by casting. Without limitation, one embodiment of a suitable material is RTV rubber, which is a silicone rubber manufactured and distributed by Silicones, Inc., 211 Woodbine Street, High Point, N.C.

D. Injection/Outlet Ports

The disclosed embodiments include injection ports for receiving weld-forming material. These injection ports penetrate through the rigid backing to fluidly couple the injection ports with the seam region to allow injection of liquid weld-forming material, such as pattern wax, into the region between two adjacent pattern segments. Injection ports may be used in combination with a second outlet port, also fluidly coupled to the seam region, through which air is expelled as a seam region receives and is filled with wax.

E. Injection Fittings

Certain of the disclosed embodiments include injection fittings that may be used in combination with injection ports to facilitate introducing weld-forming material between two adjacent pattern segments to form welds. Injection fittings reduce time and effort needed to remove wax residue from the injection ports, prevent leakage of weld-forming material, and/or prevent heat loss from weld-forming material. These benefits, whether alone or in combination, improve the quality of the welds.

Injection fittings are operably coupled to injection ports, and may be constructed of any suitable material including, without limitation, metal, wood, polymeric materials, and combinations of such materials. Working embodiments of injection fittings typically included a diaphragm constructed of flexible, resilient material capable of receiving an injection nozzle used for introducing weld-forming material between adjacent pattern segments using the seam tool. Leakage of weld-forming material from the injection port is substantially reduced when injection fittings are used.

F. Fasteners/Tension Members

Certain of the disclosed seam tools include two or more segments or at least one hinge about which plural tool segments rotate. These plural tool segments must be coupled together i.e., and assembled about the seam region defined by two or more adjacent pattern segments. This has been accomplished in various manners in the disclosed embodiments, and can be accomplished by other methods, including using threaded fasteners, hook and tension fasteners, through-wall clamps, solenoids, tension bands, interlocking male-female fasteners, etc. Combinations of these fasteners can be used to couple plural tool segments to one another. Certain disclosed embodiments used combinations of hook and tension and through-wall clamps.

G. Air Bladder

In some working embodiments, force imparted on the seam tool by fasteners and tension members such as those described above prevented some portions of the seam tool from tightly engaging the surface of the pattern segments, causing leaks. To prevent such leaks, a seam tool comprising an air bladder may be used. Pressurizing the air bladder in such embodiments allows sealing pressure to be uniformly applied around a seam region of complex geometry.

H. Method of Use

The method of the present invention involves securing individual pattern segments adjacent one another in an appropriate manner to assemble the monolithic pattern by forming welds between individual pattern segments. This can be accomplished using a receiver to which the pattern segments are secured. The receiver, if necessary, can be rotated and tilted in various directions by actuating pneumatic and/or hydraulic controls.

An appropriately configured seam tool is then provided that can be placed generally on either side of a seam region defined by the edges of adjacent pattern segments. Placing the seam tool can be quite simple if the weld to be formed involves exposed, simple configurations. Alternatively, the receiver can be machined to provide ingress portions for inserting seam tools, or portions of seam tools, so that the seam tool or segment thereof can be placed appropriately to engage the separate pattern segments.

With tool segments defining a seam tool properly positioned relative to the individual pattern segments, the individual tool segments are then coupled to one another, and to form a sealing engagement with the pattern segments. This typically means coupling the tool segments one to another using fasteners provided by the individual tool segments. A seam tool comprising an air bladder may also be used, in which case a sealing engagement may be formed by pressuring the air bladder. When assembled, the seam tool provides weld-forming material injection ports through which weld-forming material is introduced into a seam region.

An appropriate weld-forming material is selected. The weld-forming material can be a variety of materials, such as an adhesive (i.e., a glue wax), but typically is gate wax. Suitable weld-forming materials include, without limitation, Ecowax, Castylene unfilled wax, Tiwax, PCC 27.5 pattern wax, PCC 27.5 unfilled wax, and GW1 wax available from Remet Corp., and KC-3882J filled wax, KC-2683 KE unfilled wax, and Sticky Wax (glue wax) available from Kindt Collins. The weld-forming material needs to be introduced into the injection ports. This is most conveniently accomplished by melting the weld-forming material, and injecting the same into the seam region through an injection port, which may be fitted with an injection fitting. Injection is continued until weld-forming material is observed exiting an outlet port fluidly coupled to the seam region into which weld-forming material is being introduced. Air in the seam region is expelled through the outlet port as wax-forming material enters the seam region. A vacuum pump may also be fluidly coupled to the outlet port to facilitate introduction of weld-forming material into the seam region.

The weld-forming material solidifies in the seam region sufficiently to form a weld between adjacently positioned pattern segments. The seam tool is dismantled and removed from about the pattern segments. An operator inspects the weld, and repairs it as may be required.

The entire process, or any portion thereof, can be automated and placed under computer control. For example, injection of weld-forming material into the injection ports can be automated.

II. Detailed Description of Disclosed Embodiment Illustrated by FIGS. 1–8

FIG. 1 illustrates one embodiment of a seam tool 10 assembled about pattern segments 12 and 14 positioned radially adjacent one another on an assembly fixture 16. Each of the individual pattern segments 12, 14 is coupled to the fixture 16. Seam tool 10 of FIG. 1 was used with a fixture 16 machined to hold and correctly position the pattern segments 12, 14 for pattern assembly and seam formation. Each of the pattern segments 12, 14 was positioned on the fixture 16 by plural clamps 18. The process may require fastening the pattern segments, such as segments 12 and 14, using clamp 18. Clamp 18 may not be required if the fixture does not need to be rotated.

The disclosed seam tool of FIG. 1 includes plural injection ports 20 and plural outlet ports 22. Liquid weld-forming material is introduced into the injection port(s) 20. Injection port(s) 20 may be fitted with an injection fitting 500, as shown in FIGS. 13–16 and described in detail in part V below. As the weld-forming material fills the seam region 24, air occupying the seam region is expelled. The disclosed embodiments worked best when the injection ports 20 and outlet ports 22 were separated by distances of about 12 inches or less, but the distance between injection and outlet ports depends on several factors, including but not limited to: (1) heat transfer from the weld forming material into the pattern segments and resilient material (with a given seam region geometry, such as wall thickness and seam gap, there may be a distance limit where a maximum loss of thermal energy occurs such that the weld material will not fuse to the pattern wax followed by a limit where the weld forming material obtains a sufficient viscosity to prevent further flow in the seam region); (2) convenience for placing a through wall baffle, injection, and outlet ports; (3) the desire to inject near a flange to provide maximum strength for holding the assembly together; (4) optimizing the location of vents to allow maximum expulsion of air.

Figure 2:
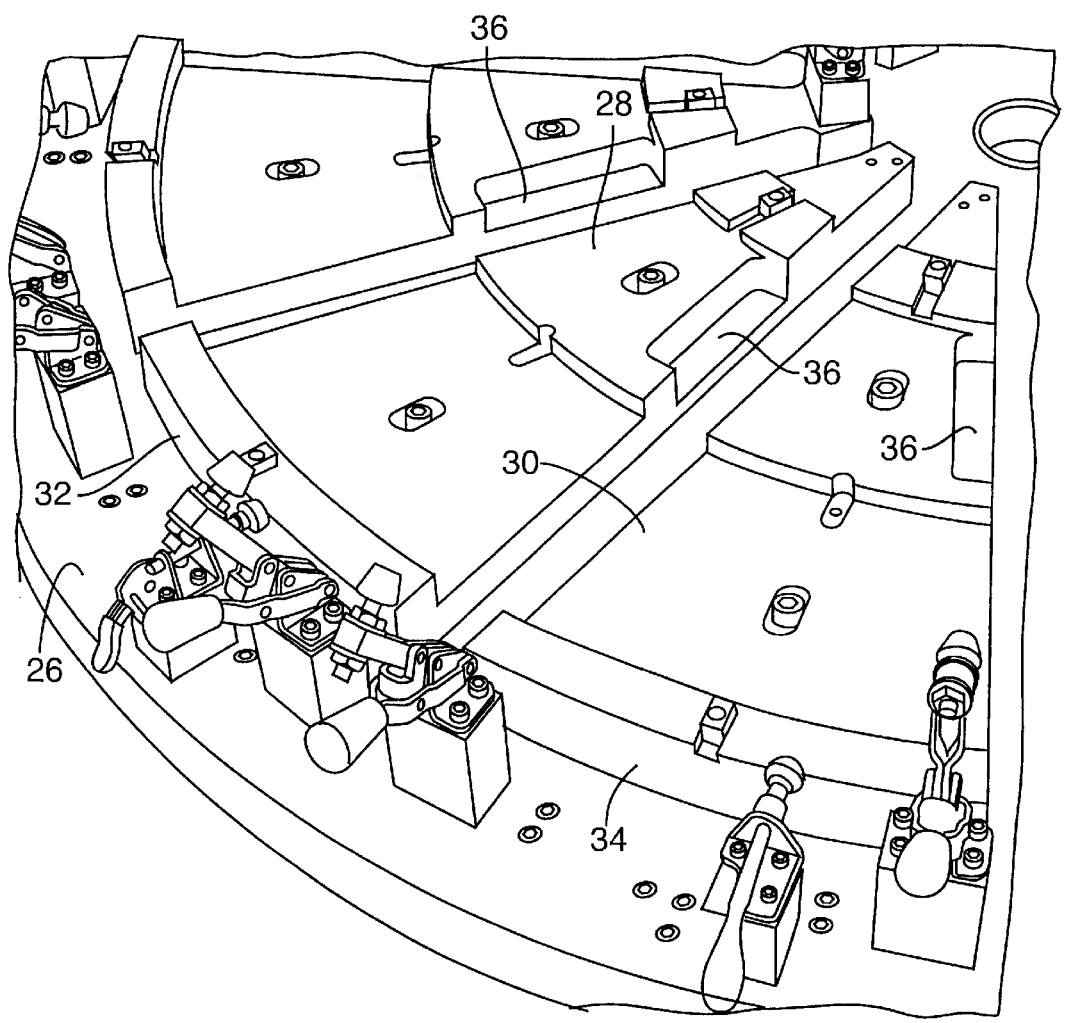
FIG. 2 is a perspective view of a portion of the fixture illustrated in FIG. 1.
Figure 8:
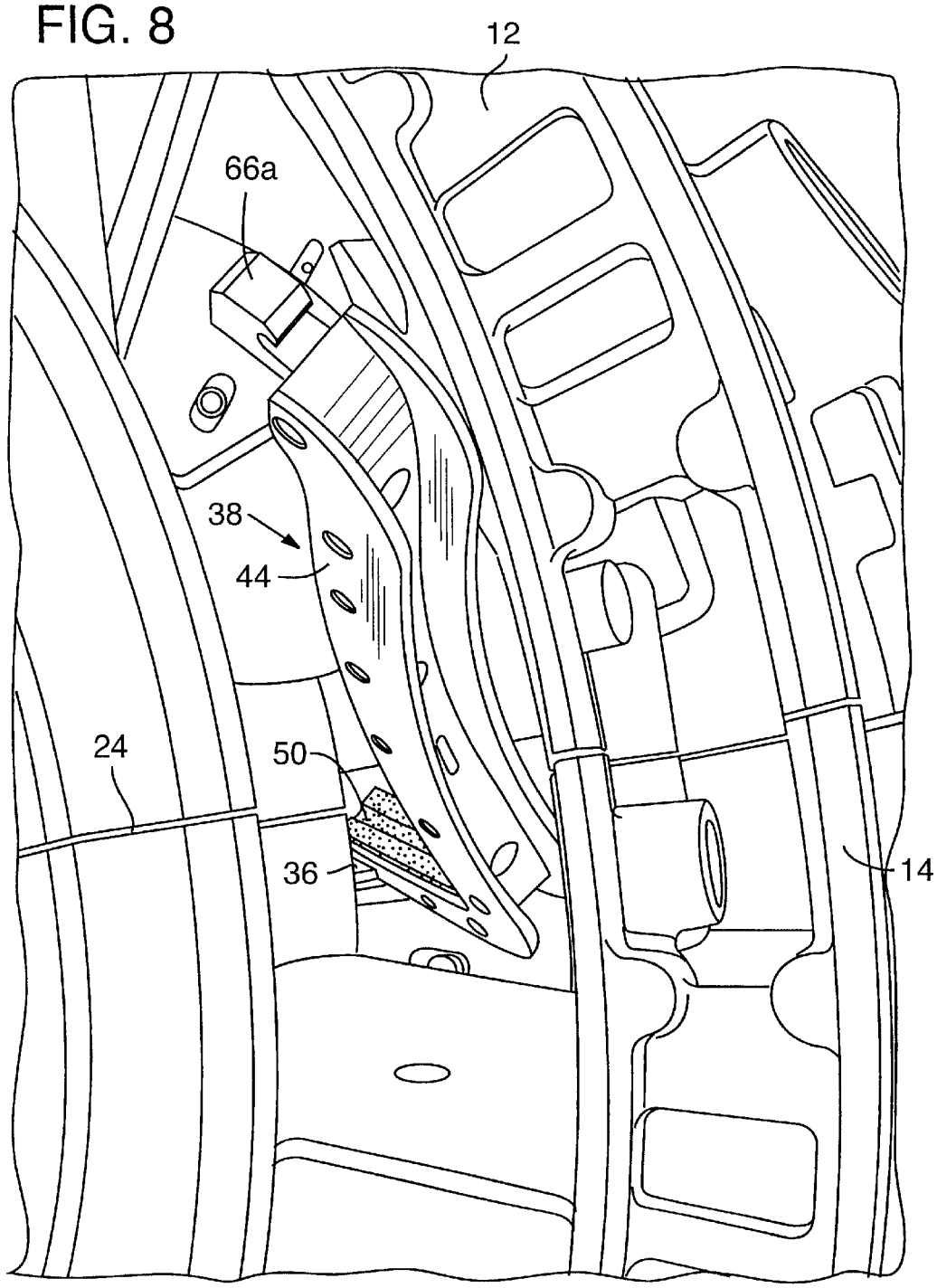
FIG. 8 is a perspective view illustrating one method for positioning a portion of the seam tool of FIG. 1 properly about the junction between adjacent pattern segments.

FIG. 2 illustrates one embodiment of a receiver 16 prior to positioning pattern segments 12, 14 thereon. The receiver has surface 26 upon which plural pattern segments are coupled. The configuration of the receiver 16 is determined by the configuration of the cast article to be formed. Upper major surface 26 may be a machined to receive pattern segments 12, 14, and if necessary, to provide regions for attaching a seam tool to the receiver 16. For example, the receiver 16 includes plural, trapezoidal pattern segment supports, such as supports 28 and 30, each of which has an arcuate face portion 32, 34 respectively. Each pattern segment support 28, 30 may be machined to receive a particular pattern segment required to form the monolithic final pattern. FIG. 2 illustrates that pattern segment supports 28 and 30 include pattern segment tool-receiving cavities 36. A portion of a seam tool may be inserted into a cavity 36 as shown by FIG. 8 during assembly of the tool in preparation to form a weld between pattern segments.

Receiver 16 also includes plural fasteners 18, or clamp means, to fasten the pattern segments, such as 12 and 14, to the receiver in the proper position for forming the monolithic pattern. The illustrated fasteners 18 comprised clamping members, which clamped the pattern segments 12 and 14 to the receiver 16.

The receiver 16 can be fluidly coupled to pneumatic or hydraulic controls, and/or a computer, to allow the operator to tilt the receiver 16, and hence pattern segments such as 12 and 14 coupled thereto, during pattern assembly to aid the assembly process. Certain disclosed embodiments of the seam tool 10 have rendered tilting the receiver 16 unnecessary.

Figure 3:
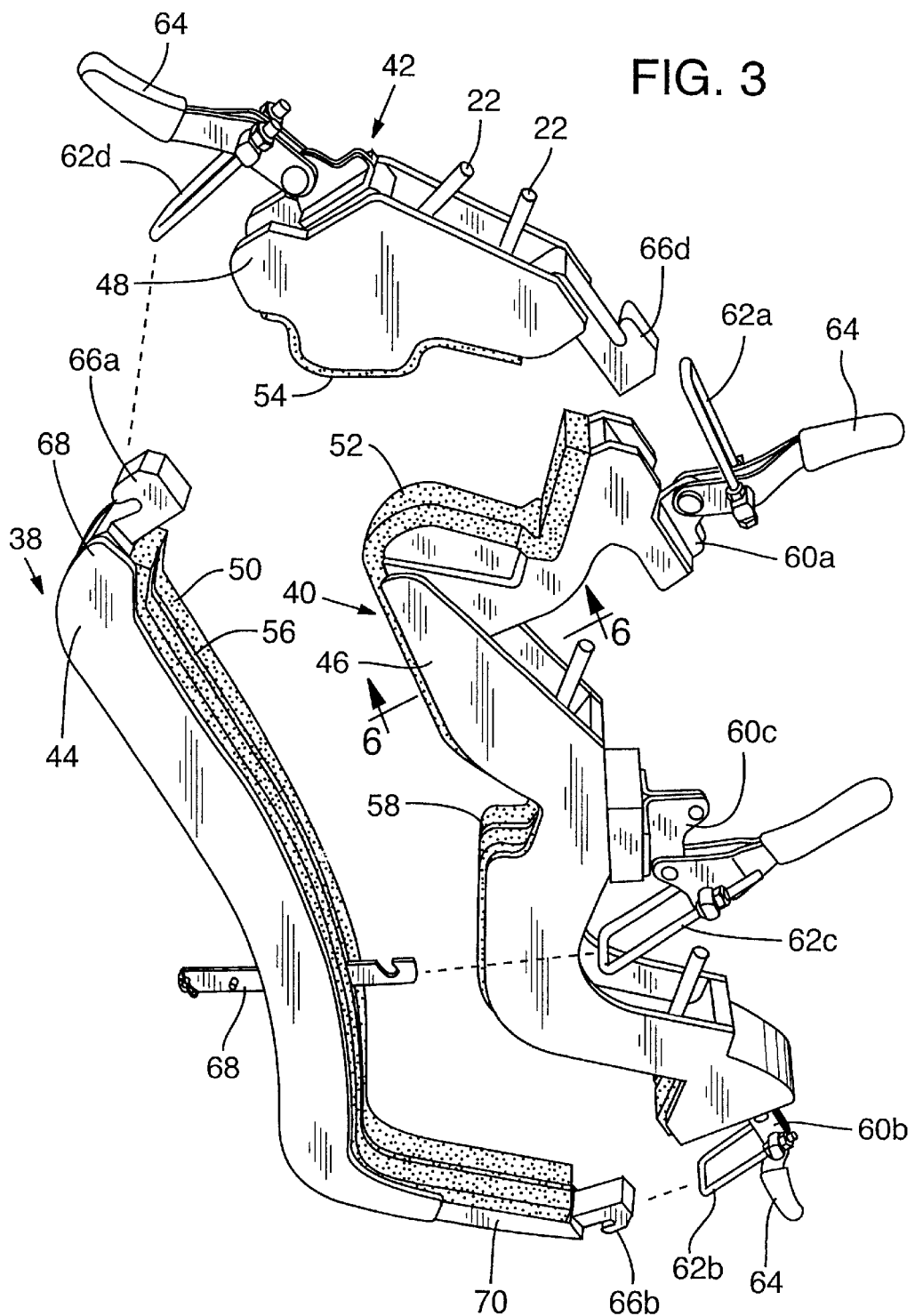
FIG. 3 is an exploded view of the seam tool illustrated in FIG. 1.

FIG. 3 is an exploded view of the seam tool 10 illustrated in FIG. 1. The disclosed embodiment has three individual portions, first segment 38 and second segment 40, which bracket the seam region 24 defined by adjacent pattern segments 12 and 14 when the tool 10 is assembled. Seam tool 10 also includes an end 42, which provides a barrier for receiving weld-forming material and helps join the first and second segments 38, 40 when the disclosed tool 10 is assembled. Each of the segments 38, 40 and 42 includes a rigid backing, with the first segment having rigid backing 44, the second segment having rigid backing 46, and the end having rigid backing 48. Each segment 38, 40 and 42 also includes resilient material cast adjacent the rigid backing to form seals with the pattern segments when assembled, with the first segment 38 having resilient material 50, the second segment 40 having resilient material 52, and the end 42 having resilient material 54.

Each portion of the resilient material 50, 52 and 54 positioned directly over the seam region, typically a few millimeters wide, with the illustrated embodiment being which 2.5 mm wide, includes a compensating groove. FIG. 3 illustrates compensating groove 56 in the resilient material 50 of segment 38, and compensating groove 58 in the resilient material 52.

The individual tool portions 38, 40 and 42 must be coupled together about the seam region 24 defined by adjacent segments 12 and 14 so that a weld can be formed. In the disclosed embodiment, the individual portions 38, 40 and 42 couple together with hook and ratchet clamps 60. Segment 40 includes plural U-bolts 62 coupled to tension handles 64. Elongate segment 40 includes a first hook 66a on a first end 68 and a second hook 66b on a second end 70. Hook 66b of segment 38 is inserted into its respective U-bolt 62b on segment 40. Rotating clamp handles 64 urges the individual tool portions 38 and 40 tightly against the pattern segments 12 and 14.

Pattern segments 38 and 40 also include a through-wall hook 68 for further securing the individual tool segments 38, 40 and 42 against the pattern segments 12, 14 when the disclosed tool 10 is assembled. The through-wall hook 68 is further illustrated in cross section by FIG. 5. Elongate through wall hook 68 is inserted through aperture 71 defined by the rigid backing 46 of segment 40 and aperture 72 defined by rigid backing 44 of segment 38 and is inserted into the receiver 62c of clamp 60c. Rotating and securing handle 64 of the through-wall hook 68 further urges the tool segments 38, 40 and 42 against the pattern segments 12, 14 to provide a fluid-sealing engagement. The through wall hook 68 creates a baffle in a seam region 24 to weld-forming material introduced into the channel. The baffle is located in seam region 24 at a position selected for blocking the weld-forming material from progressing beyond the baffle, which position typically is determined by (1) geometry of the pattern segments 12, 14, and hence the seam tool 10, and (2) limiting the length of the seam region 24 into which one injection port feeds wax-forming material to thereby limit weld defects, such as air bubbles. Once the seam tool 10 is removed, the through-wall clamp 68 leaves an aperture through the weld which is patched by an operator.

Pattern segment 40 includes an injection port 20 for receiving weld-forming material in the seam region 24 located above the through-wall hook 74. An air outlet port 22 is paired with this injection port 20 through which air is expelled as wax is injected into the region 24.

End portion 42 includes a hook 66d. The hook 66d engages U-bolt 62a on tool segment 40. The U-bolt 62d engages hook 66a of tool segment 38.

Tool segment 40 includes injection ports 20 and segment 40 and end portion 42 include outlet ports 22. Injection and outlet ports 20, 22 are best illustrated in FIGS. 4 and 7. With reference to FIG. 4, which illustrates the tool 10 after assembly, a first injection port 20a is located at a bottom portion 79 of the tool 10. Injection port 20a may be fitted with an injection fitting 500. As illustrated best in FIG. 7, injection port 20a passes through rigid backing 46 and sufficiently through resilient material 52 to allow injection of weld-forming material into the seam region 24. Air is expelled through outlet port 22a. Weld-forming material injected into port 20a fills the seam region 24 up to through-wall hook 74 and is discontinued when wax is observed flowing from outlet port 22a.

FIG. 6 illustrates the compensating groove 80 in cross section. When the tool 10 is assembled and tightly engages the surface of the pattern segments 12, 14, compensating groove 80 is positioned directly about the seam region 24 defined by adjacent pattern segments. Compensating groove 80 allows weld-forming material to completely fill the seam region. Without compensating groove 80, the resilient material 50, 52 and/or 54 is forced into the seam region 24 as the tools segments 38, 40 and 42 are urged against the pattern segments 12, 14. Compensating groove 80 allows the resilient material 50, 52 and/or 54 to align flush with the surfaces of the pattern segments 12, 14 adjacent the seam region 24, thereby allowing the formation of a weld that is flush or slightly positive (in the form of a wax ridge) with the outer surfaces of the pattern segments 12, 14.

In certain embodiments, force applied in urging tool segments against pattern segments creates differential variants in the weld. An investigation of wax ridge height versus position around the tool was conducted. By varying the dimensions of the compensating groove, variations in positive welds produced by the groove could be substantially eliminated. For example, the depth of the compensating groove can be varied as shown in FIG. 6A. The results of the investigation of wax ridge height versus position around the tool in one embodiment are contained in Table 1, below.

TABLE 1

| POINT[1] | (INCHES)[2] | (INCHES)[3] |
|---|---|---|
| 1 | 0.033 | −0.025 |
| 2 | 0.000 | 0.000 |

TABLE 1-continued

| POINT[1] | (INCHES)[2] | (INCHES)[3] |
|---|---|---|
| 3 | 0.005 | 0.000 |
| 4 | 0.015 | −0.010 |
| 5 | 0.016 | −0.010 |
| 6 | 0.026 | −0.020 |
| 7 | 0.033 | −0.025 |
| 8 | 0.036 | −0.030 |
| 9 | 0.036 | −0.030 |
| 10 | 0.036 | −0.030 |
| 11 | 0.033 | −0.025 |
| 12 | 0.025 | −0.020 |
| 13 | 0.010 | 0.000 |
| 14 | 0.002 | 0.000 |
| 15 | 0.019 | −0.010 |
| 16 | 0.020 | −0.010 |
| 17 | 0.058 | −0.050 |
| 18 | 0.036 | −0.030 |
| 19 | 0.027 | −0.020 |
| 20 | 0.043 | −0.035 |
| 21 | 0.043 | −0.035 |
| 22 | 0.043 | −0.035 |
| 23 | 0.040 | −0.030 |
| 24 | 0.035 | −0.025 |
| 25 | 0.028 | −0.020 |
| 26 | 0.020 | −0.010 |
| 27 | 0.051 | −0.045 |
| 28 | 0.010 | 0.000 |

[1]Points measured at 1" increments around perimeter of pattern seam.
[2]Wax ridge height on seam between wax pattern segments formed with seam tool comprising compensating groove with a constant depth of 0.060".
[3]Measuring templates ranged from 0.010" to 0.060" and were made in 0.005" increments. The groove depth adjustment was made with a smooth transition between each measured point.

III. Detailed Description of Disclosed Embodiment Illustrated by FIGS. 9–10

FIGS. 9 and 10 illustrate a second embodiment of a seam forming tool 100 according to the present invention. FIG. 9 illustrates the disclosed embodiment assembled, and FIG. 10 is an exploded view of the tool 100 of FIG. 9. As with the embodiment illustrated in FIGS. 1–8, the embodiment of FIGS. 9 and 10 includes plural portions, particularly five tool segments 102, 104, 106, 108 and 110 coupled by hinges. The disclosed tool 100 has two primary seam bracketing portions 102 and 108, a left and top left engaging portion 104 and 106, respectively, and top right portion 110. Unlike the embodiment described above, the embodiment illustrated in FIGS. 9 and 10 has the tool segments 102–110 coupled by hinges 112–118 about which each segment can rotate separately to aid assembly of the tool 110 about a seam region 24. Each of the tool segments includes a rigid backing, with tool segment 102 including rigid backing 120, left portion 104 including rigid backing 122, top left portion 106 including rigid backing 124, large top portion 108 including rigid backing 126, and top right portion 110 including rigid backing 128. Moreover, each tool segment of the disclosed embodiment further includes resilient sealing material configured in the same shape as the rigid backing, with tool segment 102 having resilient material 130, tool segment 108 having resilient material 131, left portion 104 having resilient material 132, top left portion 106 having resilient material 134 and top right portion 110 having resilient material 136.

Tool segment 102 engages a substantially planar surface 138 of the pattern segment 140 (FIG. 10), and hence rigid backing 120 and resilient material 130 define a substantially flat pattern engaging surface 142. Tool segment 102 has no injection or outlet ports. Tool segment 102 does rotate at either end, and therefore requires some method for rotation. The illustrated embodiment has tool segments coupled by pins about which each segment can rotate. Specifically, tool segment 102 is coupled to first left portion 104 by pin 144, and to top right portion 110 by pin 146.

Left portion 104 of tool 100 is designed to include a protruding portion or tongue 148 configured to be received in correspondingly shaped receiver or groove 150 of pattern segment 140. Top left portion 106 also includes a protruding portion or tongue 152 configured to be received in corresponding shaped receiver or groove portion 154 of tool segment 140. Left portion 104 includes an injection port 156, which penetrates through the rigid backing 122, and substantially through resilient material 132. Injection port 156 may be fitted with an injection fitting 500. Weld-forming material injected into injection port 156 fills the seam region 24 from the bottom left section. Top left portion 106 includes an outlet port 158, which port penetrates the cross section of the rigid backing 124 and at least partially through the resilient backing 134, which allows air to be expelled from seam region 24.

Tool segment 108 includes a tongue 153 designed for insertion into groove 155 of pattern segment 140. Tool segment 108 includes an outlet port 160 through which air is expelled as weld-forming material is introduced into seam region 24.

Clamp 162 is coupled to tool segment 108, and includes U-bolt 164 and actuating handle 166. Clamp 162 is further coupled to tension band 168, which passes about the circumference of the tool 100.

Top right section 110 is configured to accommodate step 170 in pattern segment 140. Moreover, section 110 includes an outlet port 172 for expelling air from seam region 24. End 110 further includes clamp hook portion 174 coupled to tension band 168. Hook portion 174 engages U-bolt 164 of clamp 162. Actuating handle 166 pulls tension band 168 tightly about the tool 100 to provide a sealing engagement between the tool segments 102–110 and the pattern segment 140.

FIG. 9 shows the tool 100 assembled about the pattern segment 140, tension band 168 tightly bound about the circumference of the tool. Weld forming material is introduced into injection port 156, upwardly and to the right through seam region 24, and out outlet ports 158, 160 and 172. The operator discontinues introducing weld-forming material into injection port 156 as soon as weld-forming material is observed exiting all three outlet ports, 158, 160 and 172.

Exploded FIG. 10 illustrates the method by which the seam tool 100 is placed about the pattern segment 140. Tool 100 is open by rotation about each of its hinges 112, 114, 116 and 118 and is positioned to engage the pattern segment. Each of the seam tool segments 102–110 is then rotated as required to engage the pattern segment 140.

IV. Detailed Description of Disclosed Embodiment Illustrated by FIGS. 11–12

Figure 11:
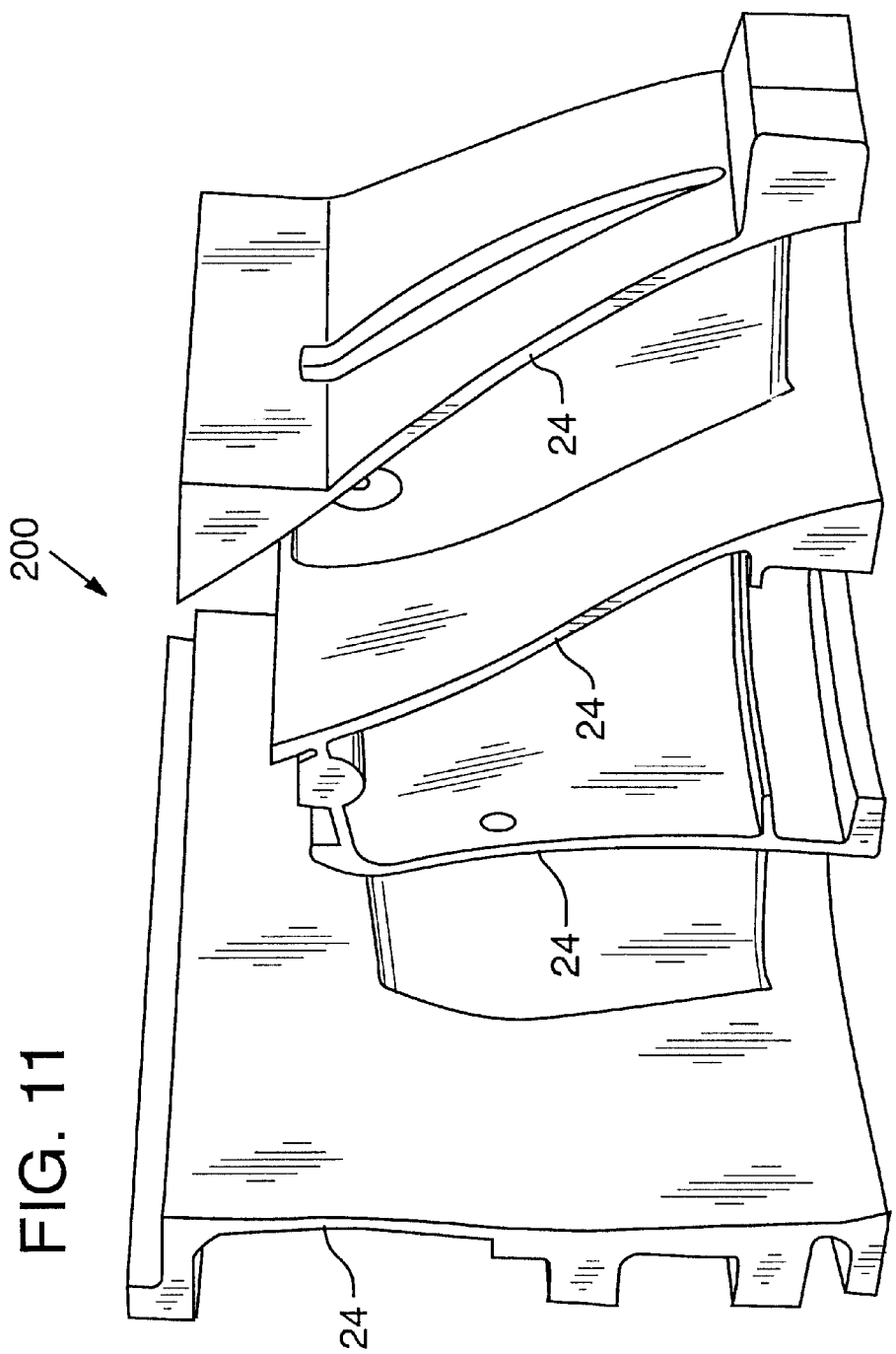
FIG. 11 is a perspective view of a pattern segment showing plural pattern edges, each requiring a separate seam tool.
Figure 12:
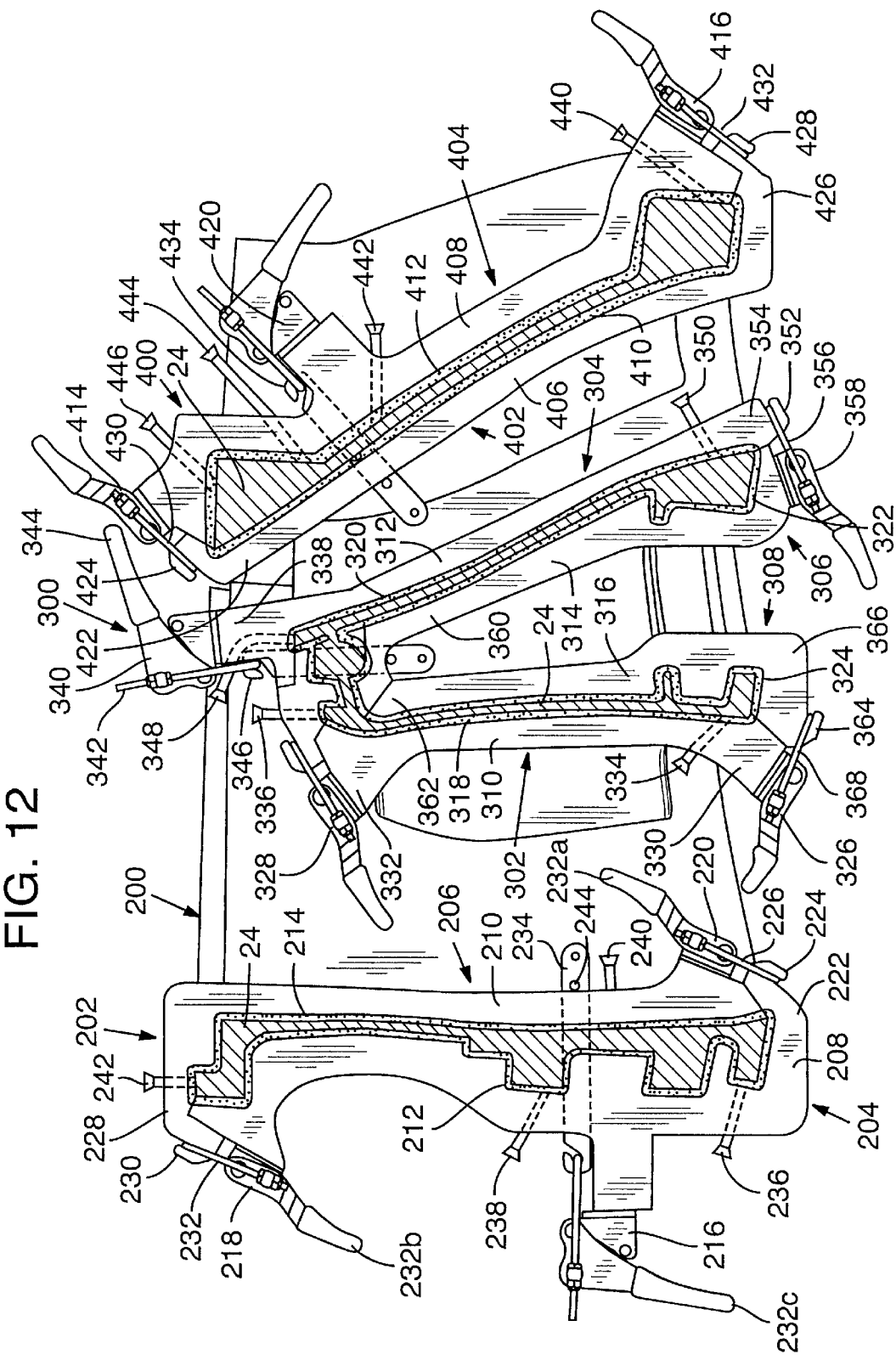
FIG. 12 is a cross sectional plan view illustrating seam tools assembled to properly position the pattern segment illustrated in FIG. 11 adjacent a second pattern segment for forming wax welds therebetween.

FIG. 11 is a perspective view of a pattern segment 200 having plural edges which, when positioned adjacent its neighbor in the monolithic pattern, define plural seam regions into which weld-forming material must be placed to weld together the adjacent segments. FIG. 12 illustrates having individual seam tools coupled about adjacent pattern segments. Each of the illustrated tool embodiments is described below.

With reference to FIG. 12, and describing the seam tools illustrated from left to right, the first seam tool 202 includes two tool segments 204 and 206. Each of these segments 204, 206 includes a rigid backing 208, 210 configured to have the same shape as the edge of pattern segment 200 about which it is placed to form a weld. Moreover, the illustrated embodiments also include resilient member liners 212, 214.

The tool segments 202 and 204 must be fastened together about the seam channel. This is accomplished using tension clamps 216, 218, 220. A first end portion 222 of the first segment 204 includes a hook 224 for engaging a corresponding U-bolt 226 on tool segment 206. Similarly, second end portion 228 of tool segment 206 includes a hook 230 for engaging U-bolt 232 on the second end 228 of tool segment 206. Tool segments 204 and 206 are coupled together by engaging the hooks 224 and 230 with U-bolts 226 and 230 and rotating tension handles 232a, 232b.

The illustrated embodiment of tool 202 also includes through-wall clamp 216. Pattern segment 206 includes an elongate hook 234 and tension handle 232c for engaging the through-wall clamp 216. Hook 234 of the through-wall clamp 216 is coupled to the tool segment 206 by pin 244, and is inserted through the rigid backing 208 of tool segment 204 when assembled. Actuating handle 232c urges the tool segments 204 and 206 together in a sealing engagement with the pattern segment 200.

The illustrated embodiment also includes injection ports 236, 238 and outlet ports 240, 242 fluidly coupled with a seam region 24. Specifically, an injection port 236 is in included through the rigid backing portion 208 of segment 204 for introducing weld-forming material in to the seam region 24 defined by edges of adjacent pattern segment. Injection port 236 may be fitted with an injection fitting 500. An outlet port 240 is located above the injection port 236, so that weld-forming material flows upwardly when introduced into the seam region 24 to expel air through outlet 240.

The elongated hook 234 acts as a baffle across the flow path in the seam region 24. Thus, a second injection port 238 is provided to fill the seam region 24 completely with weld-forming material in that portion of the seam region 24 that is between the through-wall hook 234 and outlet port 242.

Seam tool 300 is used to form welds between edges of adjacent pattern segments in a center portion of the pattern segment 200. Seam tool 300 includes 4 tool individual segments 302, 304, 306 and 308. Each of these segments 302–308 includes a respective rigid backing portion 310, 312, 314 and 316, and resilient material portions 318, 320, 322 and 324 configured in the same shape as the rigid backing. Pattern segment 302 includes two U-bolt and tension clamps 326, 328 on first end 330 and second end 332 respectively. An injection port 334 is provided at a first end 330 through which weld-forming material can be introduced into seam region 24. As with injection port 236, injection port 334 also may be fitted with an injection fitting 500. Weld-forming material is allowed to flow through the entire seam region 24, without any baffles, or need for additional weld-forming material injection ports, along the length of the seam region.

Tool segment 304 is configured to engage tool segment 302. Outlet port 336 is provided in this portion of the tool segment 304. Air is expelled through outlet port 336 as weld-forming material is introduced into injection port 334. First end 338 of tool segment 304 also includes a through wall clamp 340 having U-bolt 342 and tension handle 344. Hook portion 346 of the through-wall clamp 340 baffles a seam region 24. An outlet port 348 is provided through the first end 338 of tool segment 304 and adjacent the hook portion 346 of the through wall clamp 340. A weld-forming material injection port 350 is provided through the rigid backing 312 of the tool segment 304. Injection port 350 also may be fitted with an injection fitting 500. Weld-forming material introduced into injection port 350 flows upwardly through a seam region 24 until the entire region is filled, as indicated by material exiting the outlet port 348.

Tool segment 306 is operably coupled to tool segment 304 when assembled. Tool segment 304 includes a hook 352 formed in a second end 354 of the tool segment 304. Hook 352 is engaged by U-bolt 356 of tension clamp 358, which is attached to tool segment 306. First end portion 360 of tool segment 306 provides hook 346 of the through-wall clamp 340, which is inserted through a hook receiving aperture (not illustrated) formed through first end 338 of tool segment 304. Adjacent hook 346 is first female end 360 of tool segment 306, which defines an aperture for receiving male end 362 of tool segment 308. Tool segment 308 is operably coupled to tool segment 302 when assembled, and therefore includes a hook 364 integrally formed in a second end 366 thereof. Hook 364 is received by U-bolt 368 of tension clamp 326.

Seam tool 400 includes two tool segments 402 and 404. Each of these tool segments includes rigid backings 406 and 408, respectively, as well as resilient material portions 410 and 412 respectively. When assembled, these tool segments 406, 408 define seam region 24. Tool segment 406 is operably coupled to tool segment 408 using two hook and tension clamps 414 and 416, and through-wall clamp 420. A first end portion 422 of tool segment 402 has hook 424, and second end 426 has hook 428, integrally formed therein.

Tension clamp 414 includes U-bolt 430, and includes U-bolt 432. U-bolt 430 receives hook 424 on tool segment 402, and U-bolt 432 receives hook 428. Through wall clamp 420 engages hook 434 when tool segment 402 is operably coupled to tool segment 404.

A first weld-forming material injection port 440 is provided through the wall defined by rigid backing material 408 of tool segment 404. Weld-forming material introduced into this injection port 440 flows upwardly into seam region 24. Introduction of weld-forming material is continued until it is observed exiting outlet port 442. Hook 434 acts as a baffle in the seam region 24, blocking the weld-forming material from further moving through the seam region. A second injection port 444 is positioned adjacent the hook 434. Weld-forming material introduced into the injection port 444 flows upwardly through the seam region and eventually exits outlet port 446.

V. Detailed Description of Disclosed Embodiments of Injection Fitting

FIG. 13 is a cross-sectional schematic view of one embodiment of an injection fitting 500. Injection fitting 500 includes a wall 502 having a substantially planar first surface 504. Wall 502 defines a first recessed portion 506 for receiving an injection nozzle and second recessed portion 508. A stepped portion 510 extends upwardly from the wall 502, with a valve portion 512 extending further from the stepped portion. In a disclosed embodiment, the wall 502, stepped portion 510, and valve portion 512 are monolithically constructed of silicone rubber. However, any other suitable material may be used.

Valve portion 512 is of a suitable shape and length to facilitate injection of weld-forming material into an injection port 20. Valve portion 512 includes a diaphragm 514 constructed of flexible material that defines an aperture 516 through which an injection nozzle of a seam tool is inserted. In a described embodiment, the diaphragm 514 is constructed of silicone rubber. However, other flexible, resilient materials including, but not limited to, other polymeric materials or combinations of such materials, may be used.

Diaphragm 514 is convex in shape on the side designed for orientation toward the seam during use, and concave in shape on the side oriented toward the first recessed portion 506 into which the weld-forming material is introduced. Diaphragm 514 includes an aperture 516 through which an injection nozzle suitable for introducing weld-forming material may be inserted. The thickness of diaphragm 514 in a disclosed embodiment is approximately 0.1 inches. However, any thickness suitable for allowing introduction of weld-forming material and prevention of leakage may be used. The convex shape on the seam side of diaphragm 514 allows the aperture 516 to resist opening due to pressures on the seam side of the diaphragm, thereby preventing leakage of the weld-forming material.

FIG. 14 is a plan view of the injection fitting 500 showing the side for receiving the injection nozzle. FIG. 15 is a plan view of the injection fitting 500 showing the seam side of the injection fitting. FIG. 15 illustrates how injection nozzle 518 penetrates through the diaphragm 514 through aperture 516.

FIG. 16 illustrates the positioning and use of injection fitting 500 on a seam tool 10 assembled about pattern segments 12 and 14. An injection nozzle 518 may be inserted as shown, allowing weld-forming material to be introduced into the seam tool 10. The injection nozzle 518 also may be modified by adding a washer or other suitable stop to the injection nozzle to regulate the depth to which the injection nozzle may be inserted in injection fitting 500. Regulating insertion depth in this manner may extend the usable life of injection fittings. In a disclosed embodiment, a washer is placed on the injection nozzle approximately 0.6 inches from the tip of the nozzle. However, the washer or stop is not required. If present, the position of the washer or stop may be varied in relation to the tip of the injection nozzle.

VI. Detailed Description of Disclosed Embodiments Illustrated by FIGS. 17–20

Figure 17:
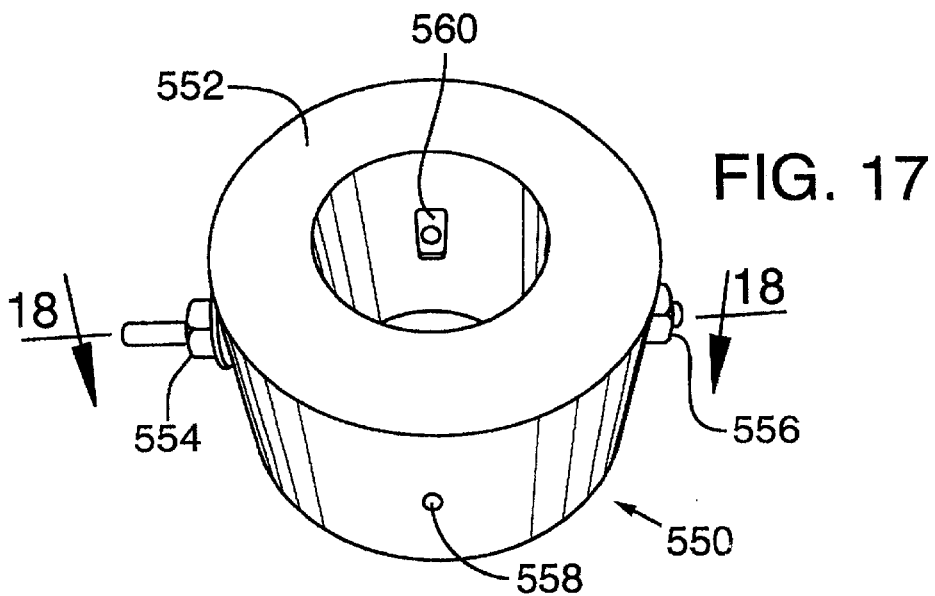
FIG. 17 is a perspective view of one disclosed embodiment of a seam tool comprising an air bladder.
Figure 18:
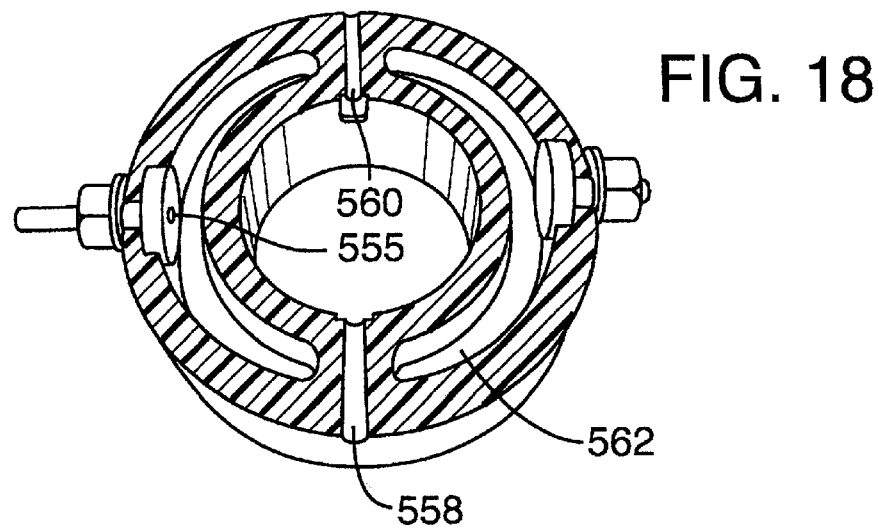
FIG. 18 is cross-sectional perspective view of the seam tool of FIG. 17 showing the positioning of the air bladder in the seam tool.
Figure 19:
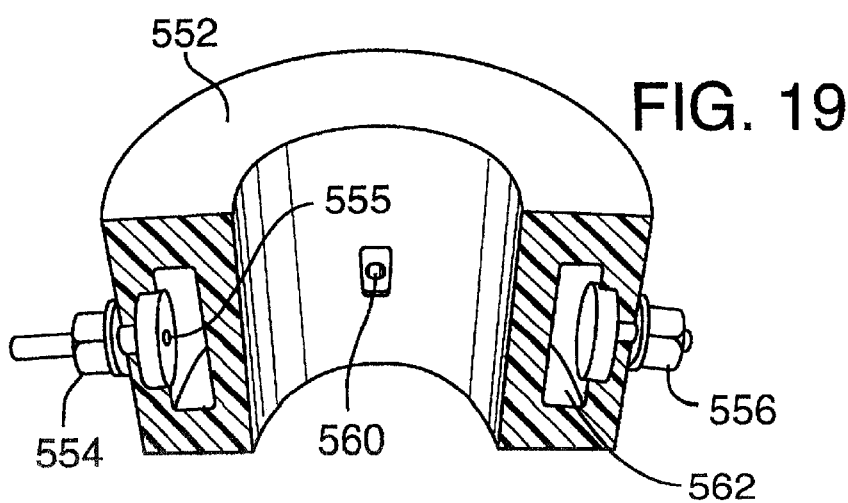
FIG. 19 is a cross-sectional perspective view of the seam tool of FIG. 17 showing the dimensions of the air bladder.

Referring to FIG. 17, a seam tool comprising an air bladder is disclosed. Seam tool 550 comprises molded resilient material 552 such as RTV silicone rubber. A variety of methods for molding resilient material such as RTV silicone rubber are known in the art. Molded resilient material 552 may be surrounded by an outer shell (not shown). The cross-sectional view in FIG. 18 shows an air bladder 562 within the molded resilient material 552 of seam tool 550. Seam tool 550 further comprises an air injection port 554 and support 556. Air injection port 554 includes air channel 555 through which air may be introduced into air bladder 562. FIG. 19 provides an additional view of the dimensions of the air bladder in one embodiment.

Air injection port 554 and support 556 may support core material used for forming injection/outlet ports 558 and 560 and air bladder 562 during the seam tool molding process. After molding, core material with a melting point lower than that of molded resilient material 552 can be melted out of the seam tool to form injection/outlet ports 558 and 560 and air bladder 562. In one embodiment, the molded resilient material is RTV silicon rubber (which can withstand exposure to temperatures up to 350° F. for a limited time) and a wax core material is used. However, other polymeric materials (such as acrylic, HDPE, and polypropylene materials) and low-melting-point alloys (including alloys MCP-47, -124, -137 and -150 available from MCP Group) may be used. Examples of suitable core materials and their respective melting points are described in Table 2 below.

TABLE 2

| MATERIAL | MELTING POINT (° F.) |
| --- | --- |
| wax | 185–200 |
| polymer | 266–320 |
| low-melting-point alloy | 117–338 |

Core materials suitable for chemical leaching also may be used, such as foams, waxes and polymeric materials that may be removed by introducing a solvent or weak acid into the core material. Alternatively, non-removed materials such as foam rubber coated with paint may be applied to internal cavities defining injection/outlet ports 558 and 560 and air bladder 562 in molded resilient material 552. Other non-removed materials which allow adequate expansion of air bladder 562 while maintaining the shape of the air bladder also may be used.

Figure 20:
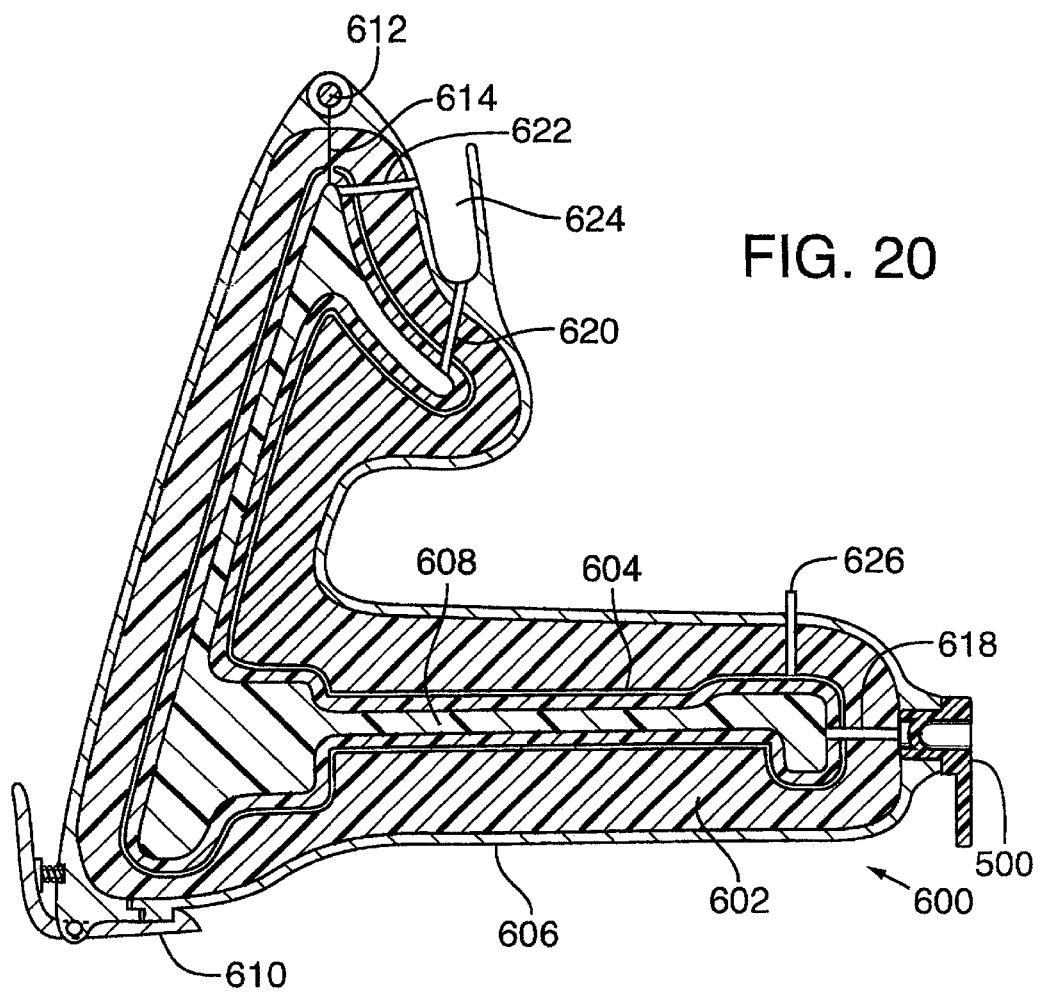
FIG. 20 is a cross-sectional side view of another disclosed embodiment of a seam tool comprising an air bladder assembled to position adjacent pattern segments properly for formation of a weld therebetween.

FIG. 20 is a cross-sectional side view of an embodiment of a seam tool 600 assembled to position adjacent pattern segments with a geometry different than patterns to be used with the seam tool shown in FIGS. 17–19. Seam tool 600 comprises molded resilient material 602 containing air bladder 604, the molded resilient material having an outer shell 606. In other embodiments, molded resilient material 602 further includes a compensating groove positioned directly about the seam region defined by adjacent pattern segments.

The seam tool is assembled about seam region 608 using fasteners or hinges such as spring-loaded clamp 610 and pin joint 612, meeting at parting line 614. Injection fitting 500 is fluidly coupled to wax injection port 618, which is fluidly coupled to seam region 608. Outlet ports 620 and 622 also are fluidly coupled to seam region 608. The illustrated embodiment of seam tool 600 includes reservoir 624 for receiving expelled weld-forming material. However, a reservoir is not required. Seam tool 600 also includes air injection port 626 fluidly coupled to air bladder 604.

A seam tool such as the one shown in FIG. 20 may be used as follows. Seam tool 600 is positioned and assembled about seam region 608 of two adjacent pattern segments (not shown). The seam tool should be assembled about seam region 608 so as to produce a mismatch between pattern segments of less than 0.030", and preferably less than 0.020". An air line is fluidly coupled to air injection port 626, and air is introduced into air bladder 604, pressurizing the air bladder to from about 2 p.s.i. to about 10 p.s.i., and preferably to from about 2 p.s.i. to about 3 p.s.i. Pressures above 10 p.s.i. may produce an undesirable negative weld. Pressurization of air bladder 604 causes the air bladder and molded resilient material 602 surrounding the bladder to expand. Molded resilient material 602 forms a seal against the pattern segments.

Weld-forming material such as gate wax is injected through injection fitting 500, which is fluidly coupled to seam region 608 via wax injection port 618. Weld-forming material is introduced into seam region 608 until it is observed exiting outlet ports 620 and 622. Reservoir 624 receives expelled weld-forming material. The air line is removed to allow the air to exit air bladder 604. Seam tool 600 is removed from the pattern segments. The weld may be inspected and repaired as described above.

The present invention has been described in accordance with working embodiments. However, it will be understood that certain modifications may be made thereto without departing from the invention. We claim as our invention the preferred embodiment and all such modifications and equivalents as come within the true spirit and scope of the following claims.

We claim:

1. A seam tool for forming welds between adjacent investment casting pattern segments, the seam tool comprising a rigid backing configured to be positioned about a seam region defined by investment casting pattern segments, the rigid backing including an injection port, a gas outlet port, and a resilient lining on a surface of the rigid backing, the resilient lining contacting a pattern segment or segments when the seam tool is positioned about the seam region.

2. The device according to claim 1 further comprising an air bladder formed in the resilient material.

3. The device according to claim 1 where the rigid backing is formed from a material selected from the group consisting of metals, alloys, wood, polymeric materials and combinations thereof.

4. The device according to claim 1 and further including an injection fitting to prevent back flow of weld forming material, the fitting having a valve portion for coupling to an injection port, the valve portion having a top wall that defines a diaphragm.

5. A seam forming tool for facilitating formation of seams in or between adjacent investment casting pattern segments, comprising:

a rigid backing configured to be positioned about a seam region defined by investment casting pattern segments; and pattern segment clamping means for clamping the rigid backing about the seam region, at least one of the rigid backing and the clamping means including an injection port for receiving weld-forming material and an outlet port.

6. The device according to claim 5 where the clamping means include seal means.

7. The device according to claim 6 where the seal means are formed from a resilient material.

8. The device according to claim 6 where the seal means include a compensating groove.

9. The device according to claim 8 where the dimensions of the compensating groove are variable.

10. The device according to claim 5 and including plural injection ports fluidly coupled to plural outlet ports.

11. The device according to claim 10 and further including an injection fitting having a valve portion sized for coupling to an injection port, the valve portion having a top wall that defines a diaphragm to prevent back flow of weld forming material.

12. A method for forming a weld between plural, adjacently positioned investment casting pattern segments, comprising:

providing at least two investment casting pattern segments;

positioning the at least two investment casting pattern segments adjacent one another to define a seam region therebetween;

providing a seam tool comprising a rigid backing, a resilient material on an inside surface of the rigid backing, a weld-forming material receiving port, and an outlet port fluidly coupled to the receiving port;

positioning the seam tool about the seam region so that the resilient material on the inside surface of the rigid backing contacts the seam region; and introducing weld-forming material into the injection port to form a weld.

13. The method according to claim 12 where the pattern segments are coupled to a receiver.

14. The method according to claim 12 where the process is computer controlled.

15. The method according to claim 12 where the weld-forming material is selected from the group consisting of unfilled wax, filled wax, pattern wax, glue wax and gate wax.

16. The method according to claim 12 where the weld-forming material is gate wax.

17. The method according to claim 12 where the seam tool includes an injection fitting operably coupled thereto, the injection fitting having a diaphragm, the method further comprising:

introducing a weld-forming-material injection nozzle through the diaphragm; and introducing weld-forming material into the seam region.

18. The method according to claim 17 where the injection nozzle is fitted with a depth stop for regulating injection nozzle penetration through the injection fitting.

19. The method according to claim 12 further comprising pulling a vacuum to facilitate introduction of weld-forming material into the seam region.

20. A method for forming a wax weld between investment casting pattern segments, comprising:

providing at least two investment casting pattern segments;

positioning the investment casting pattern segments adjacent one another to define a seam region therebetween;

providing a seam tool for positioning about the seam region defined by adjacently positioned investment casting pattern segments, the seam tool comprising a rigid backing and pattern segment clamping means for clamping the seam tool to the pattern segments, at least one of the rigid backing and the clamping means including an injection port for receiving weld-forming material and an outlet port;

clamping the seam tool about the seam region; and introducing weld-forming material into the injection port.

21. The method according to claim 20 where the clamping means include seal means.

22. The method according to claim 21 where the seal means are formed from a resilient material.

23. The method according to claim 21 where the seal means include a compensating groove.

24. The method according to claim 20 where the seam tool includes plural injection ports fluidly coupled to plural outlet ports.

25. A fitting for an injection port in a seam tool, the fitting comprising a wall having a first substantially planar surface, a recessed portion for receiving an injection nozzle, and an upwardly extending valve portion sized for coupling to an injection port, the valve having a top wall that defines a diaphragm.

26. A seam tool for forming welds between adjacent investment casting pattern segments, comprising:

a rigid backing configured to be positioned about a seam region defined by at least two investment casting pattern segments adjacent one another, the rigid backing further including an injection port and a gas outlet port; and a resilient lining on a surface of the rigid backing which contacts and forms a seal with at least one surface of a pattern segment, the resilient lining further defining an air bladder fluidly coupled to an air injection port.

27. A seam tool for forming welds between adjacent pattern segments, comprising:

a rigid backing configured to be positioned about a seam region defined by at least two pattern segments adjacent one another, the rigid backing further including an injection port and an outlet port; and a resilient lining on a surface of the rigid backing for contacting and forming a seal with surfaces of the pattern segments, the resilient lining further including a compensating groove and an air bladder fluidly coupled to an air injection port.

28. A seam tool for forming welds between adjacent investment casting pattern segments, the seam tool comprising:

a rigid backing configured to be positioned about a seam region defined by investment casting pattern segments, the rigid backing including an injection port and a gas outlet port; and a resilient lining on a surface of the rigid backing, the resilient lining contacting a pattern segment or segments when the seam tool is positioned about the seam region, the resilient lining including a compensating groove.

29. A seam tool for forming welds between adjacent investment casting pattern segments, the seam tool comprising:

a rigid backing configured to be positioned about a seam region defined by investment casting pattern segments, the rigid backing including an injection port and a gas outlet port; and a through-wall clamp.

30. A seam-forming tool for forming seams with investment casting pattern segments, comprising:

a rigid backing configured to be positioned about a seam region defined by two adjacent pattern segments; and pattern segment clamping means for clamping the rigid backing about the seam region, at least one of the rigid backing and the clamping means including an injection port for receiving weld-forming material and an outlet port, the clamping means including seal means formed from a resilient material for forming a seal with an investment casting pattern segment.

31. The tool according to claim 30 where the seal means include a compensating groove.

32. A method for forming a weld between plural, adjacently positioned investment casting pattern segments, comprising:

providing at least two investment casting pattern segments;

positioning the at least two investment casting pattern segments adjacent one another to define a seam region therebetween;

providing a seam tool comprising a rigid backing, a resilient material on an inside surface of the rigid backing, a weld-forming material receiving port, and an outlet port fluidly coupled to the receiving port;

positioning the seam tool about the seam region so that the resilient material on the inside surface of the rigid backing contacts the seam region;

coupling a vacuum line to the outlet port to reduce pressure in the seam region; and introducing weld-forming material into the injection port to form a weld.

33. A method for forming a wax seal between investment casting pattern segments, comprising:

providing at least two investment casting pattern segments;

positioning the investment casting pattern segments adjacent one another to define a seam region;

providing a seam tool for positioning about the seam region defined by the adjacently positioned investment casting pattern segments, the seam tool comprising a rigid backing and pattern segment clamping means for clamping the seam tool to the pattern segments, at least one of the rigid backing and the clamping means including an injection port for receiving weld-forming material and an outlet port, the clamping means further including seal means that define a compensating groove;

clamping the seam tool about the seam region; and introducing weld-forming material into the injection port.

34. A seam tool for forming welds between adjacent investment casting pattern segments, comprising:

a rigid metal backing portion contoured for positioning about a seam region defined by at least two investment casting pattern segments adjacent one another to define a seam region therebetween;

a resilient lining on a surface of the rigid backing for contacting and forming a seal with surfaces of the pattern segments, the resilient lining further including a compensating groove and an air bladder fluidly coupled to an air injection port;

clamping means for clamping the backing portion about the seam region and urging the resilient lining against the surfaces of the pattern segments, at least one of the rigid backing and the clamping means including an injection port for receiving weld-forming material and an outlet port; and an injection fitting for coupling to an injection port, the fitting having a diaphragm operable to receive an injection nozzle for introducing weld-forming material into the seam region.

35. A system for forming welds between adjacent investment casting pattern segments, comprising:

a receiver for fixedly positioning investment casting pattern segments adjacent one another;

a rigid metal backing portion contoured for positioning about a seam region defined by at least two investment casting pattern segments positioned adjacent one another on the receiver, the rigid backing further including an injection port and an outlet port;

a resilient lining on a surface of the rigid backing for contacting and forming a seal with surfaces of the pattern segments, the resilient lining further including a compensating groove; and clamps for clamping the backing portions about the seam region and urging the resilient lining against the surfaces of the pattern segments.

36. The system according to claim 35 further comprising an injection fitting for coupling to an injection port.

37. The system according to claim 36 where the injection fitting defines a diaphragm operable to receive an injection nozzle for introducing weld-forming material into the seam region, the diaphragm preventing back flow of weld-forming material.

38. A seam tool for forming welds between adjacent investment casting pattern segments, the seam tool comprising:

a rigid backing configured to be positioned about a seam region defined by investment casting pattern segments, the rigid backing including an injection port and a gas outlet port; and an injection fitting coupled to at least one injection port, the fitting having a diaphragm to substantially prevent back flow of weld forming material from the injection port.

* * * * *